July 15, 1958   W. S. PAJES   2,843,004
METHOD OF APPLYING INDICIA TO TRANSPARENCIES AND
METHOD OF AND APPARATUS FOR PROJECTING IMAGES OF
SAID INDEXED TRANSPARENCIES UPON A SCREEN
IN REFLECTED LIGHT
Filed Nov. 27, 1953                                           2 Sheets-Sheet 1
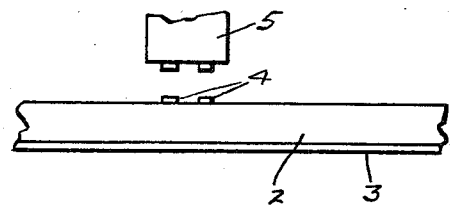
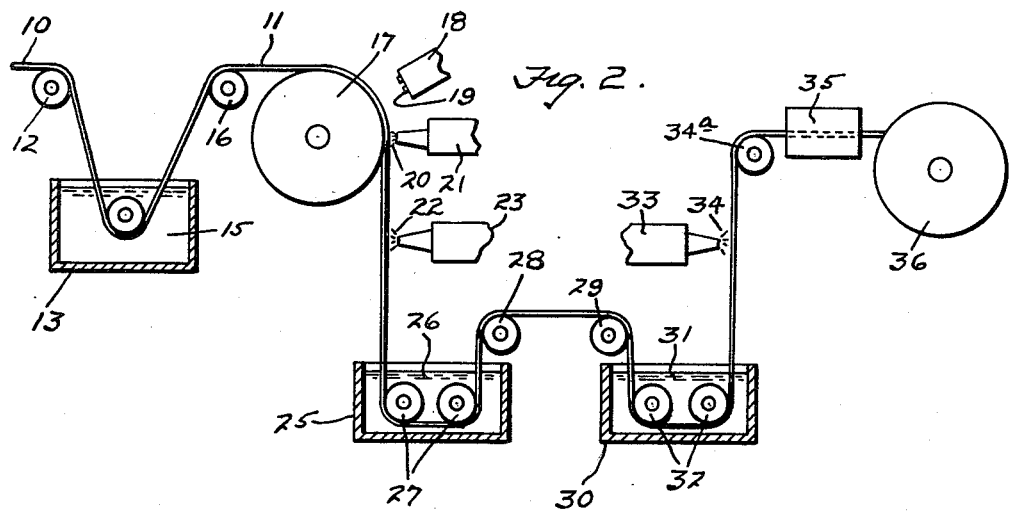
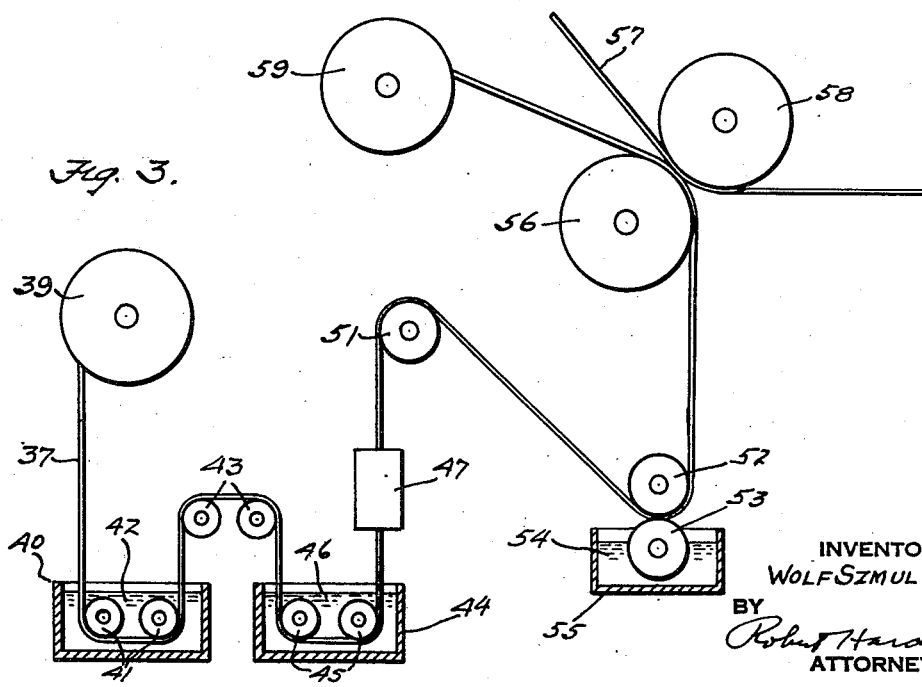
INVENTOR
WOLF SZMUL PAJES
BY
Robert Harding Jr.
ATTORNEY July 15, 1958
W. S. PAJES
2,843,004
METHOD OF APPLYING INDICIA TO TRANSPARENCIES AND
METHOD OF AND APPARATUS FOR PROJECTING IMAGES OF
SAID INDEXED TRANSPARENCIES UPON A SCREEN
IN REFLECTED LIGHT
Filed Nov. 27, 1953
2 Sheets-Sheet 2
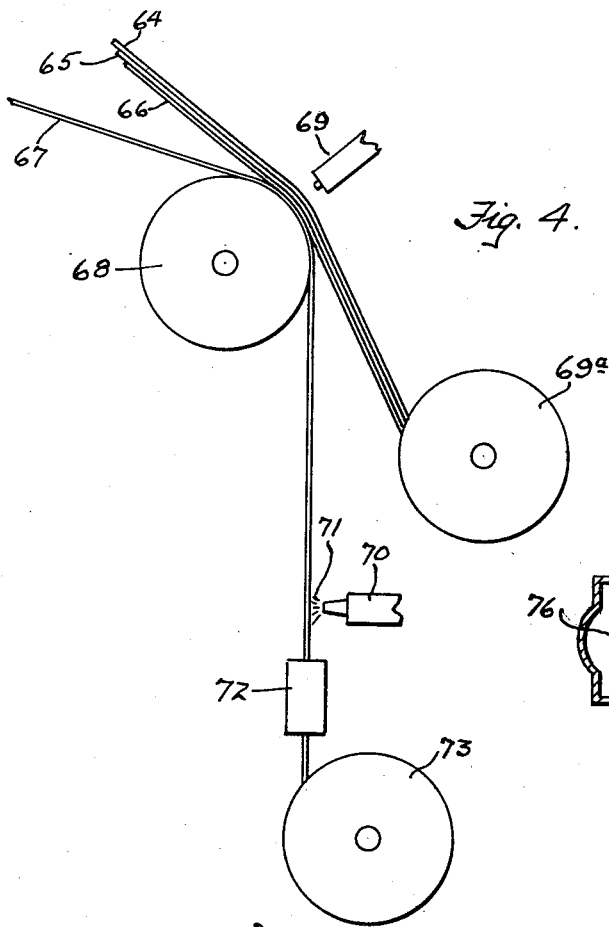
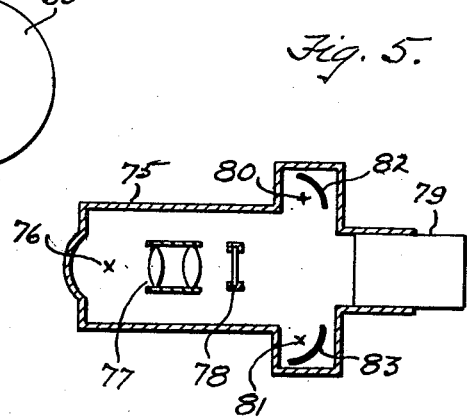
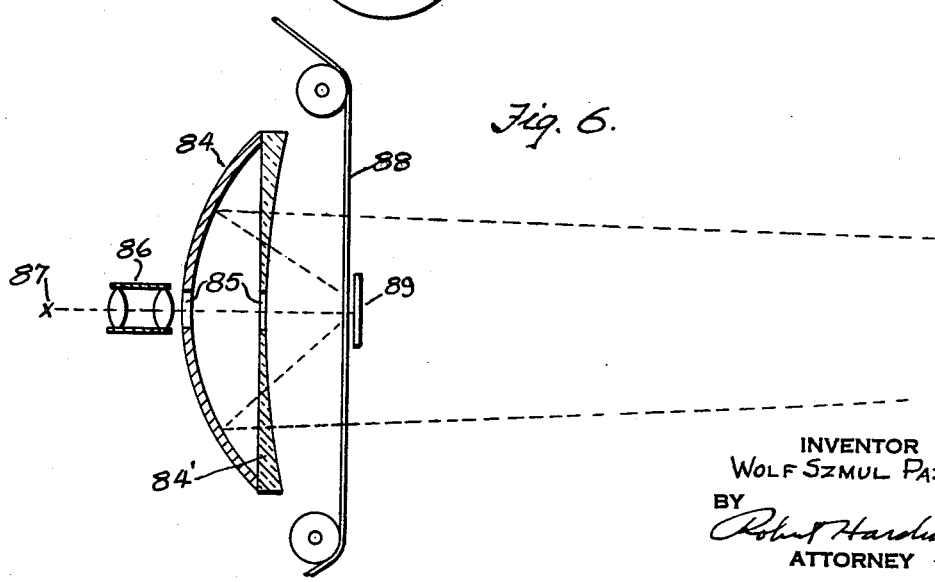
INVENTOR
WOLF SZMUL PAJES
BY
Robert Harding Jr.
ATTORNEY

United States Patent Office 2,843,004
Patented July 15, 1958

2,843,004

METHOD OF APPLYING INDICIA TO TRANSPARENCIES AND METHOD OF AND APPARATUS FOR PROJECTING IMAGES OF SAID INDEXED TRANSPARENCIES UPON A SCREEN IN REFLECTED LIGHT

Wolf Szmul Pajes, New York, N. Y.

Application November 27, 1953, Serial No. 394,592

6 Claims. (Cl. 88—16)

This invention relates to a method of applying indicia, such as explanatory subtitles to transparencies, in particular to motion picture film, and to a method of and apparatus for projecting images of said transparencies including the subtitles upon a screen.

Impressing explanatory subtitles on already completed motion picture film by means of the known method of etching or bleaching the emulsion is a satisfactory method, since white letters are produced when the image on the film is projected upon the screen. However, this very method gives much less satisfactory results when a color film is used which consists of several different emulsion layers. Unless all the emulsion layers are removed, by etching or bleaching, the brightness and hue of the projected characters will not be uniform, and the hue and brightness will fluctuate with the momentary background. Still less satisfactory results are obtained with the method of direct printing of the subtitle on a film with opaque paints or inks. When projected in the usual manner, these printed letters appear black and are difficult to read against the usual background of a film scene.

It is one of the objects of this invention to provide a method of impressing explanatory subtitles on any type of motion picture film by means of printing or stamping with opaque paints or inks and projecting images thereof upon a screen in such a manner that the letters of the projected image will appear in the color of the ink or paint.

Another object of the invention is to provide a method of impressing explanatory subtitles on motion picture film and projecting an image of the film upon a screen by means of which method the subtitles may be applied with ordinary printing techniques.

Still another object of the invention is to provide a method of impressing explanatory subtitles on motion picture film with opaque materials and projecting an image of said film and subtitles upon a screen using a single light source.

Another object of the invention is to provide a method of impressing explanatory subtitles on motion picture film which produces metallic characters having light reflecting or dispersing qualities.

Still another object of the invention is to provide a projection apparatus for motion picture film having subtitles of opaque material on the side of the film facing the screen.

The invention is illustrated in the accompanying drawings, in which:

Figure 1 is a side elevational view of a film showing one method of applying or impressing the subtitles;

Figure 2 is a schematic representation of another method of impressing the subtitles;

Figure 3 is a schematic representation of still another method of impressing the subtitles;

Figure 4 is a schematic representation of still another method of impressing the subtitles;

Figure 5 is a sectional elevational view of a projector illustrating one method of projecting images in accordance with the invention; and Figure 6 is a schematic sectional plan view of another form of projector which may be used with the invention.

Referring now more specifically to the drawings, a film 1 is shown in Figure 1 having a base 2 of acetate or any other suitable transparent material and the usual layer or layers 3 of emulsion. Characters 4 of the explanatory subtitle are applied to the side of the film facing the screen by means of any suitable method, such as the typographical block 5 which applies the characters directly by ordinary printing technique.

The material used in printing the subtitle characters may be any opaque ink or paint of the desired color having a high reflective or light dispersive quality and having the ability to adhere to the film base. White paint has been found satisfactory and also paint or inks containing finely divided metal particles, such as aluminum, silver, or gold. Fluorescent paints may also be used with excellent results as these materials emit light when excited by a light received from an outside source. Therefore they are more effective than ordinary opaque paints for the purpose of the invention, especially as they will be illuminated directly and not through the film material.

Another method of applying the subtitles is illustrated in Figure 2. Here the film 10 is first coated with a protective layer 11 of a material, such as paraffin, which can be deformed and will retain its deformed shape. To do this the film may be passed over a roller 12 into a tank 13 where it is guided by a roller 14 through heated paraffin 15 and then out over a roller 16. Then the film 10 is passed over a roller 17 and a stencil is formed in the protective layer by pressing a typographical block 18 containing the characters 19 against the protective layer. Paint or ink 20 is then sprayed against the stencil as the film is moved past a spray gun 21.

With this method the paint or ink to be used should be one that is not dissolved by a solvent of the protective layer used, as will be evident as the description proceeds.

Then the film is passed through a stream of air 22 from a nozzle 23 to dry the paint or ink, and into a tank 25 which contains a liquid 26 which is a solvent for the protective layer but not for the paint or ink. A pair of rollers 27 may be used to guide the film through the liquid. The solvent dissolves the protective layer, leaving the characters of the subtitle intact.

The film may then be passed over rollers 28 and 29 and into a tank 30 of water 31 to remove all traces of the solvent, the film being guided through the tank by rollers 32.

After the film has left the tank 30, it may pass a spray gun 33 where it is sprayed by a suitable clear lacquer 34 to provide a protective coating to prevent chipping, crumbling, or peeling of the characters of the subtitle. The film may then pass over a roller 34a and through a drier 35 to dry the lacquer, and then it may be wound on a suitable reel 36.

Another method of impressing the explanatory subtitles on the film is illustrated in Figure 3. Here the characters of the subtitle are photographed on a separate film 37 and this separate film is then used to print the subtitles on the motion picture film. The film 37 is led from a reel 39 into a tank 40 where it passes under rollers 41, through a solution 42 which has the effect of swelling or bulging the film in places where the characters have been photographed thereon. This is a well known process used in making color film known on the market as "Technicolor."

The film is then passed over rollers 43 and down into a tank 44 where it is guided by rollers 45 through a suitable washing solution 46. The film may then be dried by passing through a drier 47.

At this stage the auxiliary film 37 is a clear film with the letters of the subtitles raised on the surface thereof. The film passes over a roller 51 and down under a roller 52 where the opaque paint or ink is applied to the raised letters of the subtitle. In order to accomplish this, an idler roller 53 is rotatably mounted so that its surface is immersed in the ink or paint 54 contained in a tank 55. Since the letters of the subtitles are raised from the surface of the film 37, they become coated with the ink or paint. The film 37 is then passed over a roller 56, and while passing over this roller, the motion picture film 57 is brought against it as it passes over a roller 58 and the subtitles are thus printed thereon. The clear film is then wound on a suitable reel 59.

Still another method of impressing the subtitles on the film is illustrated in Figure 4. With this method the letters of the subtitle are stamped on in a procedure similar to that used in the gold stamping trade and the titles comprise a thin layer of metal, such as gold or silver. A cellophane or acetate strip 64 is coated with a layer 65 of gold or silver by chemical process or by evaporation of the metal in a vacuum, in accordance with well known processes. A suitable adhesive 66, known as sizing, is applied to the metal side of the coated strip. Then the metal coated strip 64 and the film 67 are brought together over a roller 68 with the metal side of the strip against the film. Typographical blocks 69 containing the subtitles are preheated, then pressed against the strip which causes the metal to adhere to the film wherever the pressure is applied. The metal coated strip is then separated from the film, as by winding on a reel 69a, and the film caused to pass a spray gun 70 which sprays it with a clear lacquer 71 which forms a protective coating for the letters of the subtitles. The film may then be passed through a drier 72 and wound on a suitable reel 73.

Regardless of the manner of applying or impressing the characters of the subtitle, they should be applied or impressed, according to the invention, on that side of the film towards the projection screen when the picture is projected. If the film were run through an ordinary projector, the letters of the subtitle would appear black on the screen, which is undesirable. In accordance with one form of the invention, an attachment is provided for the projector to make the letters of the subtitle appear the same color as the paint or ink which has been used in applying the letters. The arrangement is illustrated in Figure 5.

In this figure, a projector 75 having the usual light source 76, condensing lens system 77, guide 78 for the film, and projecting lens 79, is provided. These correspond to the same elements in a normal projector. The additional elements, according to the invention, comprise a pair of auxiliary light sources 80 and 81, arranged at each side of the projector forward of the film guide 78, and reflectors 82 and 83 to reflect the light from the sources against the characters of the subtitle.

In operation, the image on the film is projected upon the screen in the ordinary manner with the light from the source 76 passing through the film. The projection of the image of the subtitles, however, depends on the illumination from the light sources 80 and 81, and, since they are on the side of the film facing the screen and are opaque, the scene formed in the emulsion at the places where the letters appear will not affect the projection of these characters upon the screen.

Another form of projector for projection of the images is illustrated in Figure 6. Here the principle of the Schmidt optics is used. The concave reflector 84 together with the correction lens 84' have central openings 85 at their centers through which light is directed by a condenser lens 86 from a light source 87. The film 88 is passed near the focal point of the reflector with the printed subtitles facing the reflector. A light diffusing plate 89 backing the film and positioned on the side of the film away from the reflector, and in close proximity to the film, reflects light passing through the film back to the reflector 84, thus illuminating the film itself and making it thus suitable for the scene thereon to be projected upon the screen. With this form of projector a single light source is used for projection.

In this case the indicia may be said to be on the side of the film facing the screen because that is the side of the film which the screen sees by reflection in the concave reflector.

The action of the light diffusing or reflecting plate 89 makes it possible to overcome the apparently unsurmountable difficulty of projecting a transparency impressed with opaque characters with a single source of light onto a screen whereby the characters will appear white or in their own color. The light from the source passes through the transparent portions of the film in the direction of the diffusing plate and again after it leaves the plate, thus illuminating the transparent portions of the film. At the same time light from the source directly illuminates the opaque characters of the subtitle. Both the scene and the subtitle are sufficiently illuminated, so that a bright image of both may be projected on the screen.

From the above it will be evident that I have provided a method of impressing explanatory subtitle characters on motion picture film which is applicable to black and white or colored film having any type of base material and which permits the use of a wide variety of inks and paints of assorted colors. I have also provided projection apparatus by means of which bright images of both the scene on the film and the subtitles can be projected upon a screen.

The invention is not to be limited by what has been shown and described except by the limitations contained in the appended claims.

What I desire to claim and secure by Letters Patent is:

1. The method of applying subtitles to completed motion picture films and projecting an image of the scene carried by said film upon a screen with said subtitles illuminated which comprises printing said subtitles with opaque materials on the side of said film which will be facing the screen when said image is projected, directing light through said film towards said screen in the normal manner, directing additional light against the side of said film on which said subtitles are printed, and projecting an image of the film, thus illuminated, upon a screen.

2. The method, as defined in claim 1, in which the step of printing the subtitles on the film comprises coating said film with a protective coating capable of being deformed and of maintaining its deformity, deforming said coating to form a stencil of the characters of a subtitle, spraying said coating with an opaque material of the desired color of the projected subtitle, and removing the coating.

3. The method, as defined in claim 1, in which the step of projection is done by means of a Schmidt mirror optical system.

4. The method, as defined in claim 3, further comprising the steps of intercepting light from the light source which passes through the film, and redirecting said intercepted light back through the film upon the Schmidt mirror system.

5. The method, as defined in claim 1, in which the step of printing the subtitles on the film comprises coating said film with a protective coating capable of being deformed and of maintaining its deformity, deforming said coating to form a stencil of the characters of a subtitle, spraying said coating with an opaque luminescent material, and removing said coating, and in which the step of projecting an image of the film upon the screen comprises directing light against said subtitle from the side of said film containing said subtitle, whereby the material of said subtitle is excited, and projecting an image of said film with the subtitle thus excited upon said screen.

6. A projector for motion picture film having explanatory subtitles printed on the side of the film facing the projection screen comprising a guide for said film, a light source, means for directing light against both sides of said film, means including a Schmidt mirror optical system for projecting an image of said film, thus illuminated, upon said projection screen, and light deflecting means for intercepting light from said source which passes through said film and redirecting it back through said film upon said Schmidt mirror optical system.

References Cited in the file of this patent

UNITED STATES PATENTS

| Number | Name | Date |
|---|---|---|
| 700,447 | Smith | May 20, 1902 |
| 1,198,600 | Sudmann | Sept. 19, 1916 |
| 1,294,172 | Rogers | Feb. 11, 1919 |
| 1,564,291 | Standford | Dec. 8, 1925 |
| 1,659,176 | Tillyer | Feb. 14, 1928 |
| 1,724,572 | Geisen | Aug. 13, 1929 |
| 2,098,311 | Schattschneider | Nov. 9, 1937 |
| 2,211,376 | Isbell | Aug. 13, 1940 |
| 2,489,835 | Traub | Nov. 29, 1949 |

FOREIGN PATENTS

| Number | Country | Date |
|---|---|---|
| 709,193 | France | May 11, 1931 |